Figure 1:
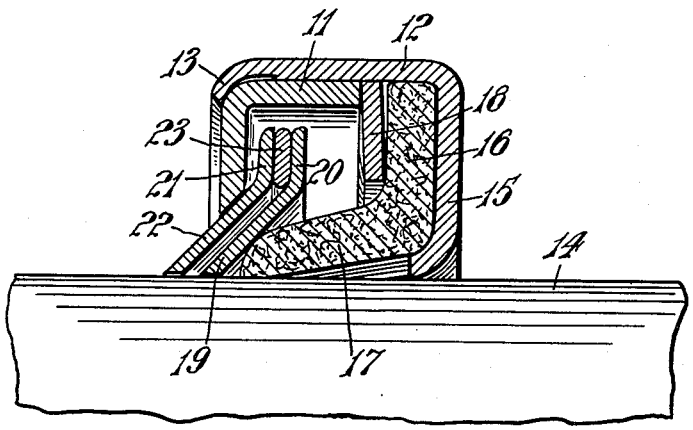

Jan. 5, 1943. W. MURRAY 2,307,152
PACKING DEVICE FOR ROTATABLE OR RECIPROCABLE ELEMENTS
Filed Dec. 22, 1941

Inventor
William Murray
by Babcock & Babcock
Attorneys

Patented Jan. 5, 1943

2,307,152

UNITED STATES PATENT OFFICE 2,307,152

PACKING DEVICE FOR ROTATABLE OR RECIPROCABLE ELEMENTS

William Murray, Leamington Spa, England

Application December 22, 1941, Serial No. 424,073
In Great Britain November 25, 1940

3 Claims. (Cl. 288—3)

This invention relates to a packing device for a rotatable or reciprocable element, of the kind including a leather or equivalent packing member having an axially extending part, the free edge of which is adapted to be pressed into contact with the rotatable or reciprocable element by an inclined portion of a spring-pressed rigid member.

In packing devices of the kind referred to the packing member, usually of substantially L-section, and the spring-pressed rigid member are of annular form, the latter having a frusto-conical portion extending to the rotatable or reciprocable element to shear the oil film. If desired, however, the packing device may be made in segmental sections.

Such a device gives excellent results as an oil seal, but there are times when it is also desirable to provide additional protection against the ingress of foreign particles—for example, when the device is to be used in a military vehicle operating in a sandy area—and my main object is to provide a packing device with additional means which will act in this way.

The invention consists in the combination with a packing device as specified, of a second rigid member having an inclined portion directed towards the rotatable or reciprocable element, with which the packing device is to coact, and substantially parallel to that of the first rigid member, the second rigid member being flexibly held in spaced relation from the first on the side thereof remote from the packing member, and the interior of the packing device, including the space between the said rigid member, contains lubricant, preferably grease.

In a preferred arrangement according to the invention, the packing device includes a housing of channel section which will face inwardly when the packing is to be associated with a rotatable or reciprocable shaft, and will, of course, face outwardly when the packing is to be carried by a piston, for example. A leather or equivalent packing member is mounted against one side of the housing, the packing member having a flange extending axially and inwardly of the housing to contact with the said element, and there are a pair of rigid members spaced axially from one another by spring means and having substantially parallel inclined portions directed towards the said element. The inclined portion of one engages the free edge of the flange aforesaid, and that of the other extends through and engages the free edge of the other wall of the housing, whilst lubricant, preferably grease, is contained in the packing device, included in the space between the said rigid members. The housing is preferably built up of annular parts, the packing member and rigid members all being rings. The spring means is conveniently a flat spring ring which is waved in an axial direction at two diametrically-opposite places, though it may take other forms.

Figure 2:
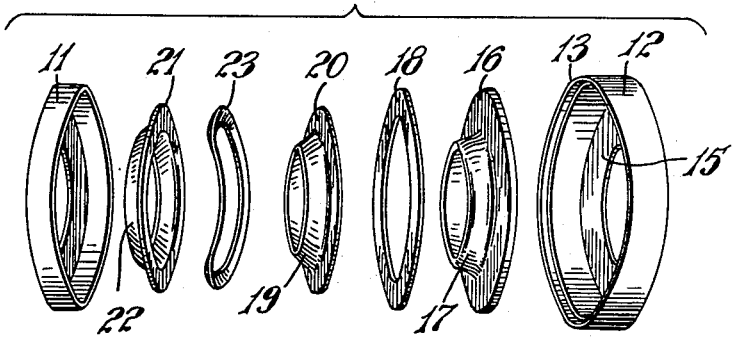

In the accompanying sheet of drawings:

Figure 1 is a fragmentary sectional view of a packing device, according to the invention, associated with a rotatable or reciprocable shaft; and Figure 2 is an exploded view of the device, to a smaller scale, before the parts have been assembled together.

In the packing device illustrated, the housing is built up of two annular pressings, 11, 12, of which the former spigots into the latter and is retained therein by the free edge 13 of the latter being peened over the former, the built-up housing thus being of channel section open towards the shaft 14 with which the packing device is associated. Mounted against one wall 15 of the housing, the radially inner end of which is slightly in-turned as shown, is a leather packing ring 16 having an axially-extending portion 17 passing inwardly of the housing and contacting with the periphery of the shaft 14. Disposed against the flat radial portion of the packing member is a dish-shaped washer 18 against which the adjacent end of the pressing 11 engages when the parts are assembled. The free edge of the axially-extending portion 17 of the packing member is engaged by the concave face of the frusto-conical portion 19 of a packing pressing member which has a preferably integral rigid ring or radial 20 which is biassed axially by spring means, the frusto-conical portion extending towards the shaft 14. Spaced from the rigid member 20 on the side of it remote from the packing member 16 is a second similar rigid sealer member having a preferably integral rigid ring or radial portion 21 and a frusto-conical portion 22 which is directed towards the shaft 14 and the convex face of which engages the adjacent edge of the pressing 11, forming therewith, in effect, a ball-and-socket joint, and serving to seal the joint between said sealer member and the housing pressing or stamping 11 against the ingress of foreign substances into said housing.

The spring means 23 above referred to acts between the rigid rings or radial portions of the members 20 and 21 to force said members axially away from each other and to respectively maintain the portion 22 of the sealer member in sealing contact with the edge of housing pressing or stamping 11 and the portion 19 of the packing sealing and pressing member in pressing contact with the axially extending portion 17 of the leather packing ring 16. In this instance said spring means is shown as taking the form of a flat annular spring 23 which is waved in an axial direction at two diametrically-opposite places. As stated, the interior of the device, including the spaces between the frusto-conical portions 19, 22 is filled with grease.

With a packing device as thus described, excellent oil-sealing properties are obtained on the one hand, and the provision of the further rigid sealer member having frusto-conical portion 21 serves for preventing the ingress of sand or other foreign bodies into the interior of the packing device.

I claim:

1. A packing device for a moving element comprising in combination a housing having two radial walls connected together, a packing member enclosed therein and having an axially extending part adapted to contact with the moving element, a rigid member having an axially disposed tapering packing pressing portion acting on said axially extending part of the said packing member, to maintain the free edge thereof in close contact with the said moving element and to shear the oil film thereon, a second rigid member having an axially disposed tapering sealing portion arranged substantially parallel with said tapering packing portion of said first rigid member and abutting the edge of a radial wall of said housing, and resilient means arranged between said rigid members and functioning to force said members apart in opposite axial directions.

2. A packing device for a moving element comprising in combination a housing of channel section and having two radial walls connected together against relative axial movement, a packing member of angle section enclosed therein and arranged with one flange thereof abutting one of said radial walls of said housing and with the free edge of the other flange adapted to be pressed against the moving element, resilient means for retaining said packing member in its operative position in said housing, a rigid packing-pressing member having a frusto-conical portion extending to said moving element and bearing against the free edge of said other flange of the packing member, a rigid sealing member of similar construction arranged substantially parallel with and at the side of the first rigid member remote from the packing member, said sealing member being supported by the other radial wall of said housing, and resilient means arranged between said rigid members and functioning to force them apart in opposite axial directions.

3. A packing device for a moving element comprising in combination a housing having two spaced radially disposed walls held against relative axial movement, a packing member of angle section enclosed in said housing and arranged with one flange thereof abutting one radial wall of said housing and with the free edge of the other flange adapted to be pressed against the moving element, a rigid packing pressing member having a frusto-conical portion extending to said moving element and formed with a rigid radial portion, a rigid sealing member having a frusto-conical portion and a rigid radial portion, said rigid members being disposed with their frusto-conical portions substantially parallel, and resilient means arranged between said rigid radial portions and functioning to press said frusto-conical portion of said packing pressing member against said packing and said frusto-conical portion of said sealing member into sealing contact with the other radial wall of said housing.

WILLIAM MURRAY.